(12) United States Patent
Cohen et al.

(10) Patent No.: US 9,009,179 B2
(45) Date of Patent: Apr. 14, 2015

(54) SYSTEM, METHOD, AND COMPUTER PROGRAM PRODUCT FOR PERFORMING GRAPH MATCHING

(75) Inventors: Jonathan Michael Cohen, Ann Arbor, MI (US); Patrice Castonguay, Menlo Park, CA (US)

(73) Assignee: NVIDIA Corporation, Santa Clara, CA (US)

( * ) Notice: Subject to any disclaimer, the term of this patent is extended or adjusted under 35 U.S.C. 154(b) by 352 days.

(21) Appl. No.: 13/462,757

(22) Filed: May 2, 2012

(65) Prior Publication Data

US 2013/0297632 A1 Nov. 7, 2013

(51) Int. Cl.
*G06F 17/30* (2006.01)

(52) U.S. Cl.
CPC .................. *G06F 17/30958* (2013.01)

(58) Field of Classification Search
CPC .................................. G06F 17/30958
USPC ................................. 707/758, 798
See application file for complete search history.

(56) References Cited

U.S. PATENT DOCUMENTS

| | | | |
|---|---|---|---|
| 7,283,611 B1 | 10/2007 | Luan et al. | |
| 2002/0030677 A1 | 3/2002 | Huang et al. | |
| 2002/0059501 A1* | 5/2002 | McKinney et al. | 711/144 |
| 2003/0069908 A1 | 4/2003 | Anthony et al. | |
| 2003/0182310 A1 | 9/2003 | Charnock et al. | |
| 2005/0099420 A1 | 5/2005 | Hoppe | |
| 2006/0028466 A1 | 2/2006 | Zhou et al. | |
| 2006/0190105 A1 | 8/2006 | Hsu et al. | |
| 2006/0274062 A1 | 12/2006 | Zhang et al. | |
| 2010/0165090 A1 | 7/2010 | Sweeney et al. | |
| 2010/0189316 A1 | 7/2010 | Walch | |
| 2011/0268364 A1* | 11/2011 | Hido | 382/218 |
| 2012/0317142 A1 | 12/2012 | Broecheler et al. | |
| 2013/0222388 A1* | 8/2013 | McDonald | 345/440 |
| 2013/0297631 A1 | 11/2013 | Castonguay et al. | |

OTHER PUBLICATIONS

Hibaoui et al., "Analysis of a Randomized Dynamic Timetable Handshake Algorithm," Laboratoire Bordelais de Recherche en Informatique (LaBRI), Apr. 16, 2009, pp. 159-169.*
Akka Zemmari, On handshakes in random graphs, Apr. 24, 2008, Information Processing Letters 108, pp. 119-123.*
Metivier, et al., Analysis of a randomized rendezvous algorithm, 2003, Information and Computation 184, pp. 109-128.*
Duan, R. et al., "Approximating Maximum Weight Matching in Near-linear Time," 51st Annual IEEE Symposium on Foundations of Computer Science (FOCS), 2010, pp. 673-682.
Vasconcelos, C. N. et al., "Bipartite Graph Matching Computation on GPU," Proceedings of the 7th International Conference on Energy Minimization Methods in Computer Vision and Pattern Recognition, 2009, pp. 42-55.
Fagginger Auer, B. O. et al., "A GPU Algorithm for Greedy Graph Matching," Lecture Notes in Computer Science, 2012, vol. 7174, pp. 108-119.

(Continued)

*Primary Examiner* — Jensen Hu
(74) *Attorney, Agent, or Firm* — Zilka-Kotab, PC (57) ABSTRACT

A system, method, and computer program product are provided for performing graph aggregation. In use, a graph with a plurality of vertices and a plurality of edges is identified. Additionally, graph matching is performed on the vertices and edges of the graph by computing a graph matching, wherein the performance of the graph matching is optimized.

20 Claims, 10 Drawing Sheets

(56) References Cited

OTHER PUBLICATIONS

Karpinski, M. et al., "Fast Parallel Algorithms for Graph Matching Problems," Oxford Lecture Series in Mathematics and Its Applications, Oxford University Press, Inc., 1998, pp. 48-49 and 101-102.
Kim, H. et al., "A multigrid method based on graph matching for convection—diffusion equations," Numerical Linear Algebra with Applications, 2003, vol. 10, pp. 181-195.
Patwary, Md. M. A., "Parallel Graph Algorithms for Combinatorial Scientific Computing," Dissertation, Feb. 2011.
Patwary, Md. M. A. et al., "Parallel Greedy Graph Matching using an Edge Partitioning Approach," Proceedings of the fourth international workshop on High-level parallel programming and applications, 2010, pp. 45-54.
Hougardy, S. et al., "Approximating Weighted Matchings in Parallel," Information Processing Letters, 2006, vol. 99, No. 3, pp. 119-123.
Hoepman, J.-H., "Simple Distributed Weighted Matchings," Oct. 19, 2004, pp. 1-7.
U.S. Appl. No. 13/461,710, filed May 1, 2012.
U.S. Appl. No. 13/461,720, filed May 1, 2012.
Bell, N. et al., "Exposing Fine-Grained Parallelism in Algebraic Multigrid Methods," Technical Report NVR-2011-002, Jun. 2011, pp. 1-30.
Gee, M. W. et al., "ML 5.0 Smoothed Aggregation User's Guide," SAND2006-2649, Feb. 2007, pp. 3-66.
Karypis, G. et al., "Parallel Multilevel k-Way Partitioning Scheme for Irregular Graphs," Society for Industrial and Applied Mathematics, 1999, vol. 41, No. 2, pp. 278-300.
Kim, H.H. et al., "A multigrid method based on graph matching for convection-diffusion equations," Numerical Linear Algebra with Applications, 2003, vol. 10, pp. 181-195.
Notay, Y., "An Aggregation-Based Algebraic Multigrid Method," Electronic Transactions on Numerical Analysis, 2010, vol. 37, pp. 123-146.
Castonguay, P. et al., U.S. Appl. No. 13/462,749, filed May 2, 2012.
Advisory Action from U.S. Appl. No. 13/462,749, dated Jun. 4, 2014.
Final Office Action from U.S. Appl. No. 13/462,749, dated Mar. 3, 2014.
Final Office Action from U.S. Appl. No. 13/462,749, dated Jun. 12, 2013.
Non-Final Office Action from U.S. Appl. No. 13/462,749, dated Aug. 25, 2014.
Non-Final Office Action from U.S. Appl. No. 13/462,749, dated Oct. 11, 2013.
Non-Final Office Action from U.S. Appl. No. 13/462,749, dated Feb. 27, 2013.

\* cited by examiner

SYSTEM, METHOD, AND COMPUTER PROGRAM PRODUCT FOR PERFORMING GRAPH MATCHING

FIELD OF THE INVENTION

The present invention relates to performing graph matching.

BACKGROUND

Performing graph matching can result in simpler, more efficient decision making. For example, graph matching may he performed to simplify a high resolution problem by creating a lower resolution problem that may be easier to solve. Graph matching may also be used to schedule communications over high-speed networks, to compute optimal matrix orderings for numerical linear algebra operations, or for kidney donation pair matching. However, current techniques for performing graph matching have been associated with various limitations.

For example, current implementations for performing graph matching have shown a variety of inefficiencies which may be amplified as data sets utilized during the graph matching increase in size. Furthermore, current implementations may show inefficiencies due to the fact that such implementations may be performed only utilizing serial methodologies. There is thus a need for addressing these and/or other issues associated with the prior art.

SUMMARY

A system, method, and computer program product are provided for performing graph matching. In use, a graph with a plurality of vertices and a plurality of edges is identified. Additionally, graph matching is performed on the vertices and edges of the graph, wherein the performance of the graph matching is optimized.

DETAILED DESCRIPTION

Figure 1:
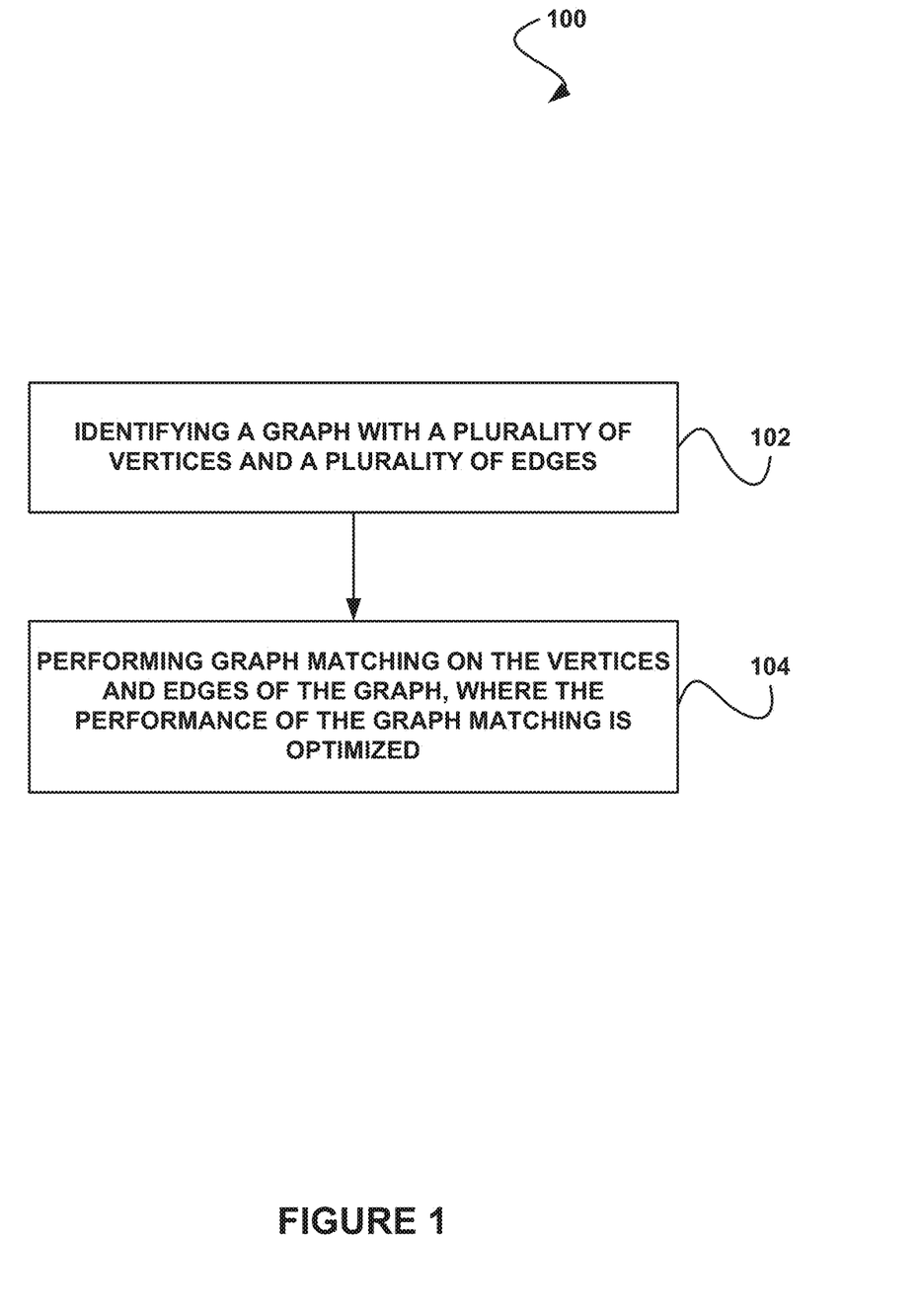
FIG. 1 Shows a method for performing graph matching, in accordance with one embodiment.

FIG. 1 shows a method 100 for performing graph matching, in accordance with one embodiment. As shown in operation 102, a graph with a plurality of vertices and a plurality of edges is identified. In one embodiment, the graph may include a representation of the plurality of vertices, where each vertex of the plurality of vertices is connected to each of one or more of the other vertices by an edge (e.g., a link, etc.). In another embodiment, each of the plurality of vertices (e.g., nodes, etc.) may represent a distinct object (e.g., a data element, etc.), such that the plurality of vertices of the graph represents a set of objects. In yet another embodiment, each edge of the graph may represent an association between the vertices directly connected by the edge. For example, two vertices directly connected by an edge may share a dependency, a contention, etc.

Additionally, in one embodiment, the graph may be representative of another environment. For example, the graph may represent the geometry of a space (e.g., a "mesh," etc.) subdivided a plurality of geometric elements (e.g., tetrahedral, cubes, etc.), where each vertex in the graph may correspond to a region of the space, and each edge may indicate that two regions of the space are adjacent to each other.

Additionally, as shown in operation 104, graph matching is performed on the vertices and edges of the graph, wherein the performance of the graph matching is optimized. In one embodiment, performing graph matching on the vertices and edges of the graph may include determining a set of one or more edges within the graph that do not have a vertex in common (e.g., an independent set of edges, etc.). In another embodiment, the graph matching on the vertices and edges of the graph may be performed as part of a multigrid method (e.g., an algebraic multigrid (AMG) method such as an aggregation AMG, etc). For example, the graph matching on the vertices and edges of the graph may be performed in order to construct a coarse operator for an AMG method.

Also, in one embodiment, the graph matching may be performed in a data-parallel manner. For example, performing the graph matching in a data-parallel manner may include considering each element (e.g., all vertices and edges) in the graph independent of all other elements in the graph during the performance of the graph matching. In another example, for any two vertices within the graph, it may not be required that one of the two vertices be processed before the other vertex during the performance of the graph matching.

In another embodiment, performing the graph matching in a data-parallel manner may include performing the graph matching by a data parallel graph matching method. In another embodiment, the graph matching may be performed utilizing a data parallel architecture. For example, the graph matching may be performed utilizing a method that is run on a data parallel architecture (e.g., a graphics processing unit (GPU) architecture, etc.).

In addition, in one embodiment, the graph matching may be performed in a data-parallel manner utilizing a handshaking method (e.g., a one-phase handshaking method, etc.). For example, utilizing the one-phase handshaking method, a single vertex within the graph may select one neighbor vertex. In another embodiment, the neighbor vertex may include a vertex that is directly connected to the single vertex by a link within the graph (e.g., a vertex not connected to the single vertex through another vertex, etc.). In yet another embodiment, the selection of a neighbor vertex by the single vertex may include the single vertex "extending a hand" to that neighbor vertex. For example, an indication of a one-sided connection from the single vertex to the neighbor vertex may be recorded, an edge between the single vertex and the neighbor vertex may be selected, etc.

Further, in one embodiment, utilizing the one-phase handshaking method, the single vertex within the graph may select the neighbor vertex according to one or more criteria. For example, the single vertex within the graph may select the neighbor vertex according to a maximal matching criteria, maximal weighted matching criteria, etc. In another example, the single vertex within the graph may select the neighbor vertex randomly. In yet another embodiment, utilizing the one-phase handshaking method, each vertex within the graph may select one neighbor vertex.

Further still, in one embodiment, utilizing the one-phase handshaking method, it may be determined for each vertex within the graph whether a mutual selection (e.g., "mutual handshake," etc.) exists between the vertex and another vertex of the graph. For example, for a particular vertex in the graph, it may be determined whether that particular vertex was selected (e.g., whether the vertex "received a hand," etc.) by a vertex that the particular vertex had also selected. In another example, it may be determined whether two vertices within the graph that share an edge both selected the shared edge connecting them.

Also, in one embodiment, utilizing the one-phase handshaking method, if it is determined that a mutual selection exists between two vertices of the graph, those two vertices may be merged within the graph. For example, merging two vertices may include collapsing the two vertices and their shared edge into a single new vertex. In another embodiment, merging of vertices may be independently performed for all vertices demonstrating mutual selection within the graph.

Additionally, in one embodiment, the one-phase handshaking method may be performed over a plurality of iterations. For example, the one-phase handshaking method may be performed on a graph, and after all vertices demonstrating mutual selection have been merged within the graph during a first iteration, the one-phase handshaking method may again be performed on all non-merged vertices of the graph during a second iteration. In another embodiment, the one-phase handshaking method may be performed until one or more criteria are met. For example, the one-phase handshaking method may be performed until a predetermined number or percentage of vertices are merged, until a predetermined number of iterations are performed, etc.

Also, in one embodiment, the computation of the graph matching may be optimized by altering the criteria by which a single vertex within the graph selects a neighbor vertex during a handshaking method. For example, during the handshaking method, every vertex in the graph may be assigned a random number, and according to the criteria, the single vertex may compare the random number assigned to the single vertex against the random numbers assigned to all of the neighbors of the single vertex.

Additionally, in one embodiment, according to the criteria, if as a result of the comparison, it is determined that the random number assigned to the single vertex is greater than all of the random numbers assigned to all of the neighbors of the single vertex (e.g., if the single vertex is the local maximum vertex), then the single vertex may identify a neighbor vertex of the single vertex that contains the smallest assigned random number. In another embodiment, according to the criteria, the single vertex may then select (e.g., "extend a hand" to, etc.) the neighbor vertex of the single vertex that contains the smallest assigned random number.

Further, in one embodiment, according to the criteria, if as a result of the comparison, it is determined that the random number assigned to the single vertex is not greater than all of the random numbers assigned to all of the neighbors of the single vertex (e.g., if the single vertex is the not local maximum vertex), then the single vertex may identify a neighbor vertex of the single vertex that contains the largest assigned random number (e.g., the local maximum vertex). In another embodiment, according to the criteria, the single vertex may then select (e.g., "extend a hand" to, etc.) the neighbor vertex of the single vertex that contains the highest assigned random number.

Further still, in one embodiment, hash functions may be used instead of random numbers during the handshaking method. For example, during the handshaking method, every vertex in the graph may select a pseudo-random number according to a hash function, and according to the criteria, the single vertex may compare the pseudo-random number assigned to the single vertex against the pseudo-random numbers assigned to all of the neighbors of the single vertex. See, for example, U.S. application Ser. No. 13/461,720, filed May 1, 2012, which is hereby incorporated by reference in its entirety, and which describes exemplary methods for utilizing a hash function during categorizing.

Also, in one embodiment, during the handshaking method, filtering may take place before the single vertex compares the random number assigned to the single vertex against the random numbers assigned to neighbors of the single vertex. For example, to perform the filtering, every vertex in the graph may be assigned a random number, and according to the criteria, the random numbers assigned to all of the neighbors of the single vertex may first be analyzed. In another embodiment, based on the analysis, a predetermined number (e.g., three, etc.) of the neighbor vertices with the highest values may be selected. In yet another embodiment, the single vertex may then compare the random number assigned to the single vertex against the random numbers assigned to the selected predetermined number of the of the neighbor vertices with the highest values.

In addition, in one embodiment, to perform the filtering, neighbor vertices with a connection strength (e.g., a number of edges at the vertex, etc) greater than a particular threshold may be selected. In yet another embodiment, the single vertex may then compare the random number assigned to the single vertex against the random numbers assigned to the selected neighbor vertices with a connection strength greater than the threshold.

In this way, the criteria by which a single vertex within the graph selects a neighbor vertex during a handshaking method may be based on a gradient (e.g., slope, etc.) along edges between a random number assigned to a single vertex within the graph and random numbers assigned to all neighbors of the single vertex within the graph, where the gradient of the edge includes the difference in magnitude between the random numbers. For example, the criteria may dictate that handshaking is performed between two neighbor vertices of the graph that has an edge with the steepest gradient.

Furthermore, in one embodiment, the graph matching may be performed in a data-parallel manner utilizing a two-phase handshaking method. For example, utilizing the two-phase handshaking method, each vertex within the graph may select their strongest neighbor vertex (e.g., their neighbor containing the most edges, etc.) as a first neighbor vertex (e.g., by "extending a first hand" to the first neighbor vertex, selecting an edge connecting the vertex to their first neighbor vertex, etc.). Additionally, each vertex within the graph may identify other vertices within the graph that selected that vertex (e.g., by "extending a first hand" to that vertex). Further, each vertex within the graph may determine a strongest selecting vertex from the other vertices within the graph that selected that vertex, where such strongest selecting vertex contains the most edges of all the vertices within the graph that selected that vertex.

Further still, each vertex within the graph may select their strongest selecting vertex as a second neighbor vertex (e.g., by "extending a second hand" to the strongest selecting vertex, selecting an edge connecting the vertex to the strongest selecting vertex, etc.). In another embodiment, all edges within the graph that were not selected by both vertices connected by the edge may be removed from the graph. In yet another embodiment, the one-phase handshaking method may be performed on the remaining vertices and edges of the graph.

Also, in one embodiment, the computation of the graph matching may be optimized by altering a number of selections made by each vertex of the graph during a handshaking method. For example, during the handshaking method, each vertex within the graph may select a predetermined plurality of their neighbor vertices (e.g., N selections, where N is an integer greater than one, etc.) as selected neighbor vertices (e.g., by "extending a hand" to each neighbor vertex, selecting each edge directly connecting the vertex to each selected neighbor vertex, etc.).

In another embodiment, all edges within the graph that were not selected by both vertices connected by the edge may be removed from the graph. In yet another embodiment, the one-phase handshaking method may be performed on the remaining vertices and edges of the graph. As a result, a higher percentage of mutual selection between vertices may occur during the handshaking method. Additionally, the number of steps of the handshaking method may be reduced.

In addition, in one embodiment, the computation of the graph matching may be optimized by altering a number of selections made by each vertex of the graph during a handshaking method, while also altering the criteria by which a single vertex within the graph selects neighbor vertices during a handshaking method. For example, during the handshaking method, every vertex in the graph may be assigned a random number, and according to the criteria, the single vertex may compare the random number assigned to the single vertex against the random numbers assigned to all of the neighbors of the single vertex.

Additionally, in one embodiment, according to the criteria, if as a result of the comparison, it is determined that the random number assigned to the single vertex is greater than all of the random numbers assigned to all of the neighbors of the single vertex (e.g., if the single vertex is the local maximum vertex), then the single vertex may identify a neighbor vertex of the single vertex that contains the smallest assigned random number. In another embodiment, according to the criteria, the singe vertex may then select (e.g., "extend a hand" to, etc.) the neighbor vertex of the single vertex that contains the smallest assigned random number.

Additionally, in one embodiment, according to the criteria, if as a result of the comparison, it is determined that the random number assigned to the single vertex is smaller than all of the random numbers assigned to all of the neighbors of the single vertex (e.g., if the single vertex is the local minimum vertex), then the single vertex may identify a neighbor vertex of the single vertex that contains the largest assigned random number. In another embodiment, according to the criteria, the single vertex may then select (e.g., "extend a hand" to, etc.) the neighbor vertex of the single vertex that contains the largest assigned random number.

Further, in one embodiment, according to the criteria, if as a result of the comparison, it is determined that the random number assigned to the single vertex is not greater than all of the random numbers assigned to all of the neighbors of the single vertex (e.g., if the single vertex is the not local maximum vertex), and that the random number is not less than all of the random numbers assigned to all of the neighbors of the single vertex (e.g., if the single vertex is the not local minimum vertex), then the single vertex may identify both a neighbor vertex of the single vertex that contains the largest assigned random number (e.g., the local maximum vertex) as well as a neighbor vertex of the single vertex that contains the lowest assigned random number (e.g., the local minimum vertex). In another embodiment, according to the criteria, the single vertex may then select (e.g., "extend a hand" to, etc.) both the neighbor vertex of the single vertex that contains the largest assigned random number and the neighbor vertex of the single vertex that contains the lowest assigned random number. As a result, a higher percentage of mutual selection between vertices may occur during the handshaking method.

In this way, graph matching may be performed within the graph utilizing a parallel graph matching method on a parallel architecture (e.g., a graphics processing unit (GPU), etc.) to create a lower resolution (e.g., "coarser") graph that may be simpler to solve than the original graph. Additionally, a set-up phase of a multi-grid method (e.g., AMG method) may be parallelized through the use of a parallel graph matching method.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
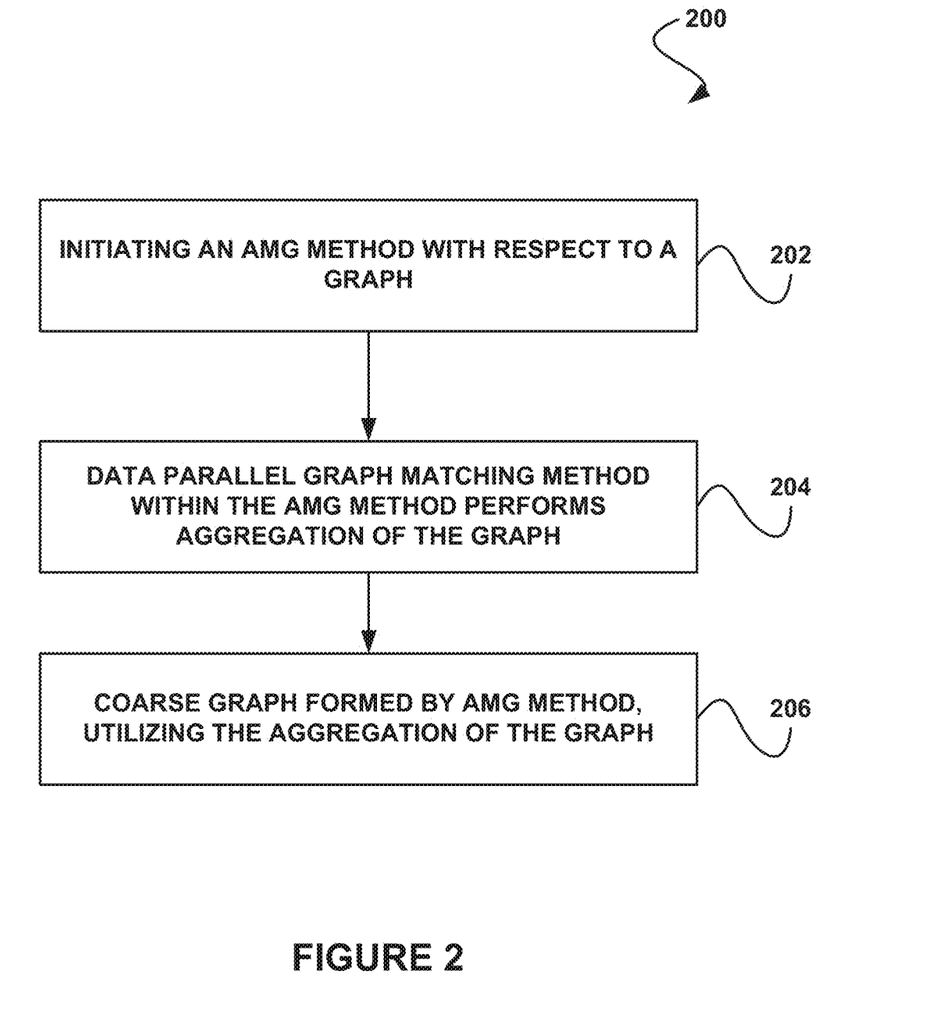
FIG. 2 shows an algebraic multigrid method implementation, in accordance with another embodiment.

FIG. 2 shows an algebraic multigrid method implementation 200, in accordance with another embodiment. As an option, the implementation 200 may be carried out in the context of the functionality of FIG. 1. Of course, however, the implementation 200 may be implemented in any desired environment. It should also be noted that the aforementioned definitions may apply during the present description.

As shown in operation 202, an algebraic multigrid (AMG) method is initiated with respect to a graph. In one embodiment, the AMG method may include a method for solving sparse linear systems of equations. It may be used in areas such as fluid simulation (CFD), reservoir simulation, and other engineering applications. In another embodiment, the AMG method may include an aggregation AMG method. For example, the AMG method may involve performing aggregation of the graph.

Additionally, as shown in operation 204, a data parallel graph matching method within the AMG method performs an aggregation of the graph. In one embodiment, the graph may include a plurality of vertices and edges, and performing an aggregation of the graph may include grouping one or more vertices and edges of the graph into clusters. In another embodiment, a graph matching may include a set of edges in a graph such that no two edges in the set share a vertex.

Table 1 illustrates an exemplary method for performing an aggregation on a graph. In one embodiment, the exemplary aggregation method illustrated in Table 1 may be used to determine aggregates of vertices where each aggregate contains a number of vertices that is a power of two. Of course, it should be noted that the method shown in Table 1 is set forth for illustrative purposes only, and thus should not be construed as limiting in any manner.

TABLE 1

```
SelectAggregatesPowerOf2(Verts, Edges, targetsize) {
    Verts[0] = Verts;
    Edges[0] = Edges;
    for (i=0; i < log2(targetsize); i++) {
        M = Matching(Verts[i], Edges[i]);
        (Verts[i+1], Edges[i+1]) = EdgeCollapse(Verts[i], Edges[i], M);
    }
    for (every v in Verts[0]) {
        Aggregates[v.after_collapse->after_collapse->...->
after_collapse].push_back(v);
    }
    return Aggregates;
}
```

Table 2 illustrates another exemplary method for performing an aggregation on a graph. In one embodiment, the method in Table 2 may be used to determine aggregates of vertices where each aggregate contains a number of vertices that is not a power of two. Of course, it should be noted that the method shown in Table 2 is set forth for illustrative purposes only, and thus should not be construed as limiting in any manner.

TABLE 2

```
SelectAggregates(Verts, Edges, targetsize) {
    int base_size = round_down_to_nearest_power_of2(targetsize);
    Verts[0] = Verts;
    Edges[0] = Edges;
    for (i=0; i < log2(base_size); i++) {
        M = Matching(Verts[i], Edges[i]);
        (Verts[i+1], Edges[i+1]) = EdgeCollapse(Verts[i], Edges[i], M);
    }
    for (every v in Verts[0]) {
        count[v.after_collapse->after_collapse->
            ... ->after_collapse]++;
    }
    // remove edges that would result in aggregates which are too large
    for (every e in Edges[i+1]) {
        if (count[e.vertex0]+count[e.vertex1]) > targetsize)
            Edges[i+1].remove(e);
    }
    // do matching and collapses as before
    M = Matching(Verts[i+1], Edges[i+1])
    (Verts[i+2], Edges[i+2]) = EdgeCollapse(Verts[i+1], Edges[i+1], M);
    for (every v in Verts[0]) {
        Aggregates[v.after_collapse->after_collapse->...->
after_collapse].push_back(v);
    }
    return Aggregates;
}
```

In one embodiment, the method "Matching(Verts,Edges)" shown above in Tables 1 and 2 may include a method to compute a graph matching, given a plurality of vertices ("Verts") and a plurality of edges ("Edges") of a graph. In yet another embodiment, the function "EdgeCollapse" shown above in Tables 1 and 2 may take a graph and a set of edges as input, and may return a new graph where each of the listed edges has been "collapsed" in that sense that an edge (v1,v2) connecting two vertices results in a new vertex "v1v2" and any incident edges (a,v1) or (a,v2) are replaced with an edge in this new graph (a,v1v2).

In addition, in one embodiment, when a set of edges to collapse form a graph matching (that is, they have no vertices in common), these collapsed may all be computed in parallel. In another embodiment, the edge collapse routine may be implemented as a special form of a sparse matrix-matrix product. In yet another embodiment, after a collapse, every vertex that was collapsed may maintain a reference to the new vertex (e.g., "v1.after_collapse=v1v2").

Further, as shown in operation 206, a coarse graph is formed by the algebraic multigrid (AMG) method, utilizing the aggregation of the graph. In this way, arbitrary sized aggregates of high quality may be computed for a general sparse graph, in a manner suitable for implementation on a data parallel architecture such as a GPU.

Figure 3:
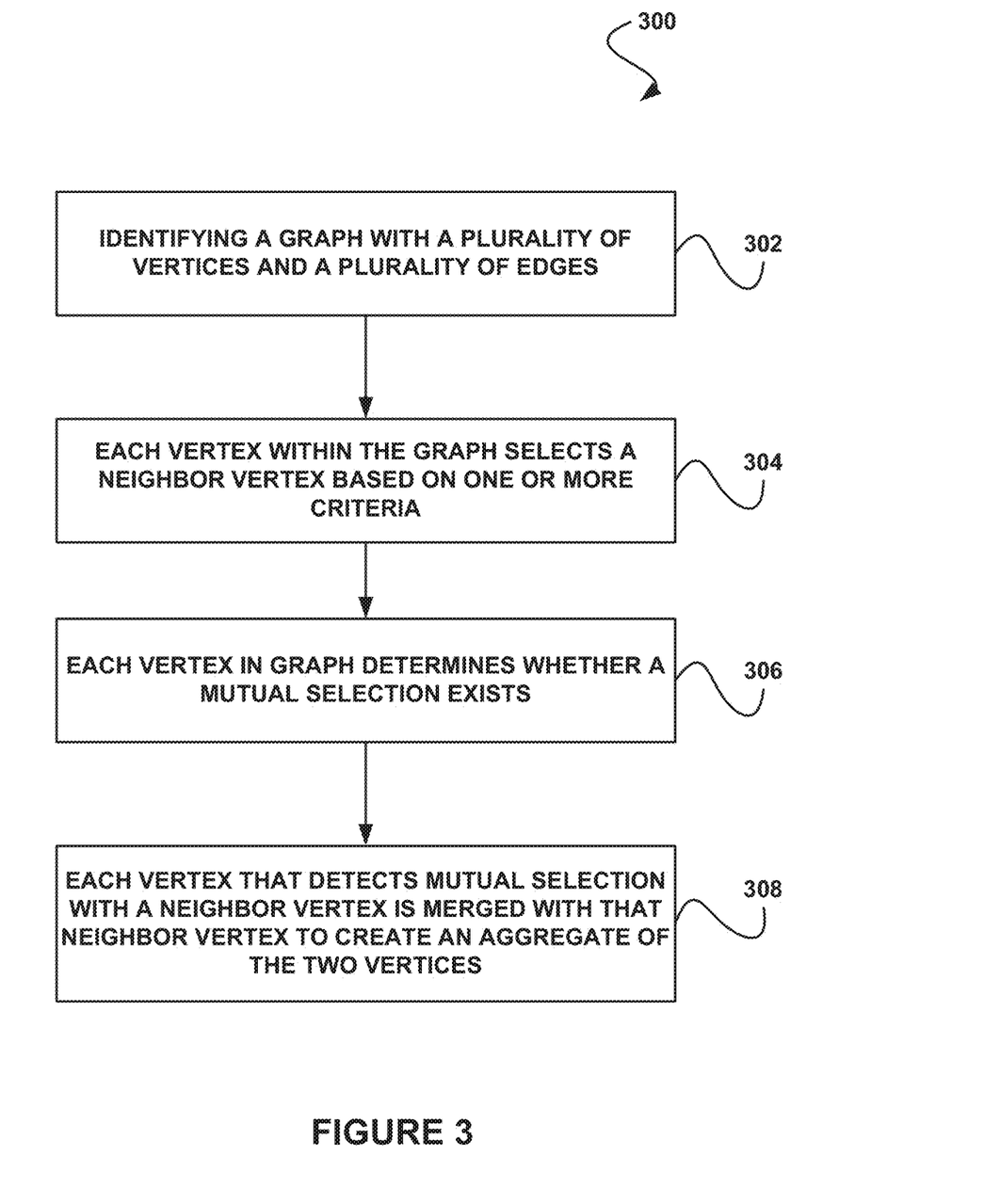
FIG. 3 shows a one-phase handshaking method for performing graph matching in parallel in accordance with yet another embodiment.

FIG. 3 shows a one-phase handshaking method 300 for performing graph matching in parallel, in accordance with another embodiment. As an option, the method 300 may be carried out in the context of the functionality of FIGS. 1 and 2. Of course, however, the method 300 may be implemented in any desired environment. It should also be noted that the aforementioned definitions may apply during the present description.

As shown in operation 302, a graph with a plurality of vertices and a plurality of edges is identified. Additionally, as shown in operation 304, each vertex within the graph selects a neighbor vertex based on one or more criteria. In one embodiment, each vertex may select a neighbor vertex that has the highest total weight of all neighbor vertices. In another embodiment, each vertex may select a neighbor vertex in a random fashion. Of course, however, each vertex may select a neighbor vertex based on any criteria.

Figure 4:
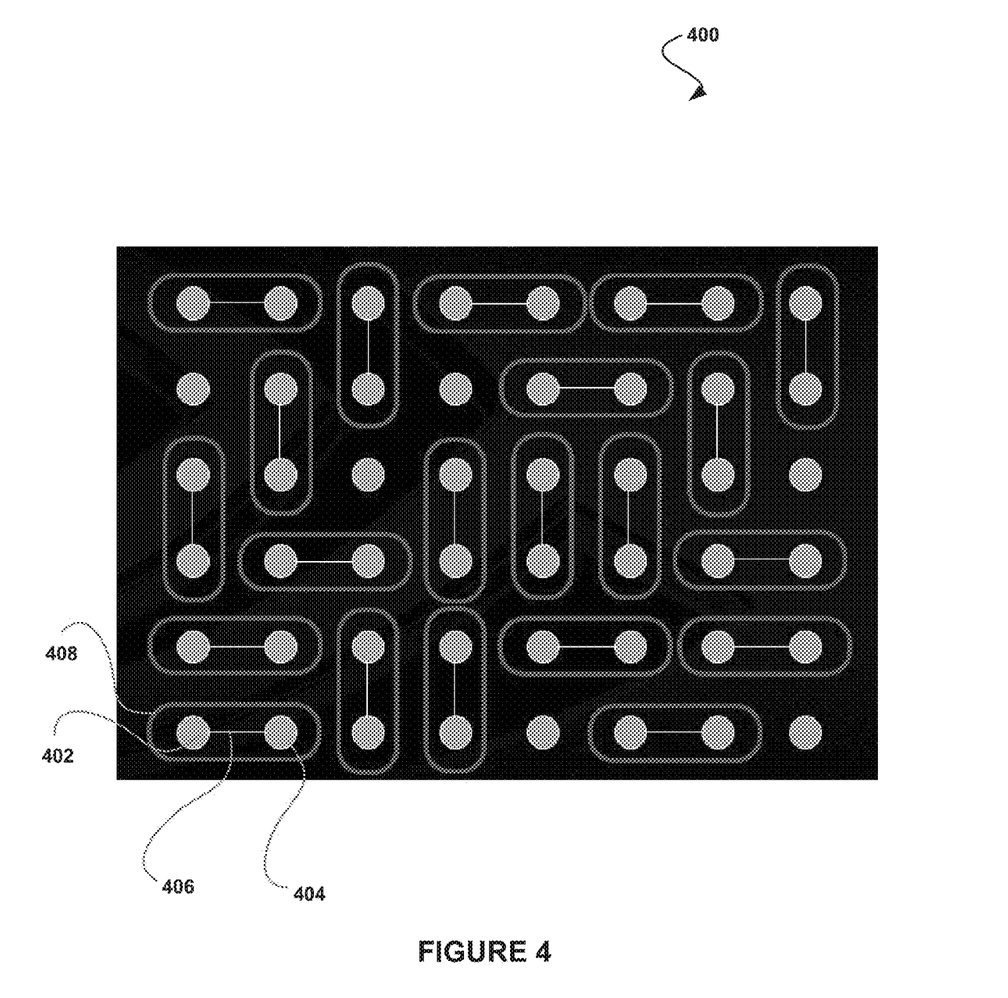
FIG. 4 shows an exemplary graph, in accordance with yet another embodiment.

Further, as shown in operation 306, each vertex in the graph determines whether a mutual selection exists between the vertex and a neighbor vertex of the graph. For example, each vertex in the graph may determine whether their selected neighbor vertex has also selected them during the selection performed in operation 304. Further still, as shown in operation 308, each vertex that detects mutual selection with a neighbor vertex is merged with that neighbor vertex to create an aggregate of the two vertices. For example, an exemplary graph is shown in FIG. 4 where a vertex 402 detects a mutual selection with a neighbor vertex 404 along an edge 406, and where that vertex 402, its neighbor vertex 404, and the edge 406 are merged to form an aggregate 408.

Also, in one embodiment, the one-phase handshaking method 300 may be iteratively repeated until all vertices or a predetermined amount of vertices of the graph are merged to form new vertices. In another embodiment, any vertices that have not been merged after a predetermined number of merges or a predetermined number of iterations may be left alone or merged with another pair of vertices that has already been merged.

Additionally, in one embodiment, merged aggregates of two vertices within the graph may then be merged to create larger aggregates (e.g., aggregates of four vertices, etc.). For example, each aggregate of two vertices formed during the one-phase handshaking method 300 may be represented as a single vertex in a new graph, and the one-phase handshaking method 300 may be repeated on the new graph.

In another example, each vertex within an aggregate may select a neighbor vertex (other than the other vertex within the aggregate) based on one or more criteria. Further, each vertex in the aggregate determines whether a mutual selection exists between the vertex and the neighbor vertex of the graph. Further still, the strongest mutual selection may be determined for the aggregate. For example, the neighbor vertex with the largest number of edges that is engaged in mutual selection with a vertex of the aggregate may be determined.

Figure 5:
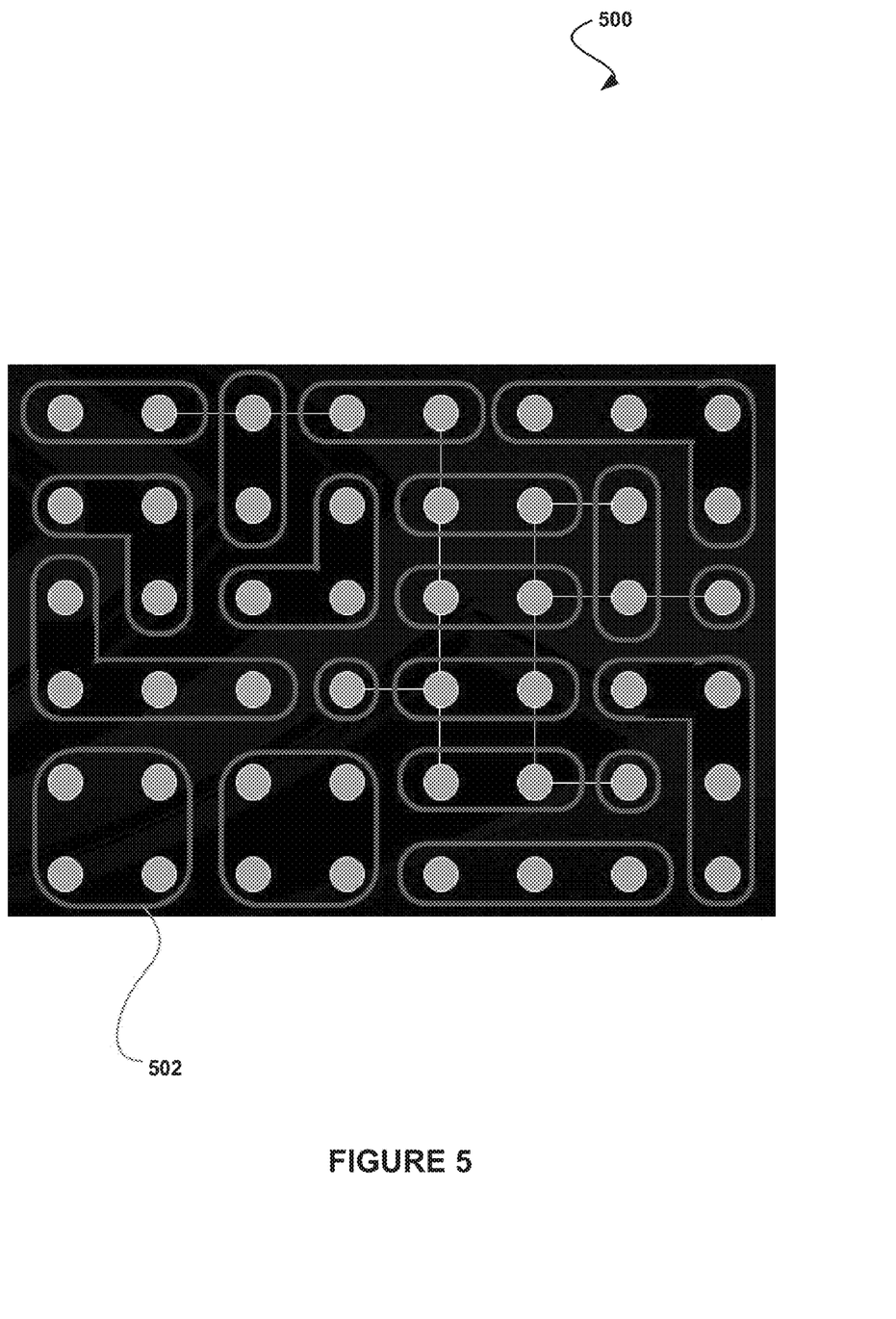
FIG. 5 shows another exemplary graph, in accordance with yet another embodiment.

Also, in one embodiment, the strongest mutual selection may be merged with the aggregate to create a larger aggregate. For example, another exemplary graph is shown in FIG. 5 where a first aggregate containing a neighbor vertex with the largest number of edges that is engaged in mutual selection with a vertex of a second aggregate may be merged with the second aggregate to form a larger aggregate 502 with a total of four vertices. In this way, the need to make an intermediate graph may be avoided when aggregating more than two vertices.

Figure 6:
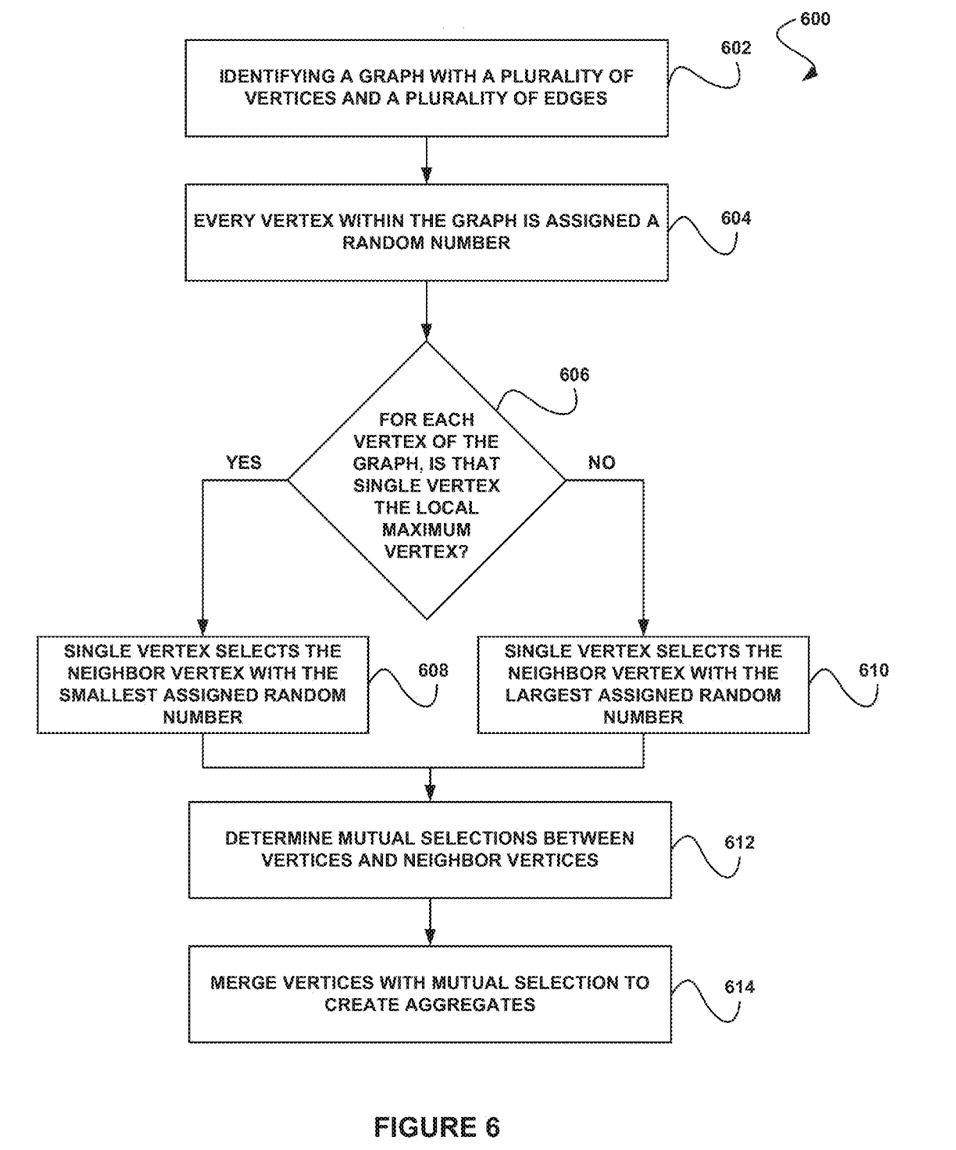
FIG. 6 shows a method for gradient based matching, in accordance with yet another embodiment.

FIG. 6 shows a method 600 for gradient based matching, in accordance with another embodiment. As an option, the method 600 may be carried out in the context of the functionality of FIGS. 1-5. Of course, however, the method 600 may be implemented in any desired environment. It should also be noted that the aforementioned definitions may apply during the present description.

As shown in operation 602, a graph with a plurality of vertices and a plurality of edges is identified. Additionally, as shown in operation 604, every vertex in the graph is assigned a random number. Further, as shown in operation 606, for each single vertex of the graph (e.g., each vertex within the graph), it is determined whether that single vertex is the local maximum vertex. For example, each single vertex within the graph may compare the random number assigned to the single vertex against the random numbers assigned to all of the neighbors of the single vertex. Additionally, it may be determined whether the random number assigned to the single vertex is greater than all of the random numbers assigned to all of the neighbors of the single vertex.

Additionally, if it is determined in operation 606 that a single vertex is the local maximum vertex, then in operation 608 the single vertex selects the neighbor vertex with the smallest assigned random number. Further, if it is determined in operation 606 that a single vertex is not the local maximum vertex, then in operation 610 the single vertex selects the neighbor vertex with the largest assigned random number. Further still, as shown in operation 612, for each vertex in the graph, it is determined whether a mutual selection exists between the vertex and a neighbor vertex of the graph. Also, as shown in operation 614, each vertex that detects mutual selection with a neighbor vertex is merged with that neighbor vertex to create an aggregate of the two vertices.

In one embodiment, every vertex A within the graph may be assigned a random value phi(A). If phi(A) is greater than phi(B) for all connected vertices B (e.g., if A is a local maxima), then A may extend a hand to the neighbor B with the lowest phi(B). If phi(A) is not greater than all neighboring phi values (e.g., A is not a local maxima), then A may extend a hand to the neighbor with the largest phi(B) value.

This may be equivalent to choosing a "direction" to extend a hand to corresponding to the steepest gradient downhill (if a vertex is at a locally maximum point) or uphill (otherwise). This method may yield superior results than other handshaking criteria when the graph does not have some deeper physical structure. For example, on a graph corresponding to a sparse matrix from a discrete CFD problem, the strong edges may tend to line up in the same (physical) direction. However, if the graph is modified to have the same connectivity, but all edge weights (i.e. matrix entries) are set to 1 (this situation may occur for an isotropic Laplacian matrix), the "steepest gradient" criteria illustrated hereinabove may provide improved results. In another embodiment, by enforcing a (random) local structure on the graph, nearby vertices may be "forced" to tend to shake hands with each other.

Additionally, a number of modifications to the above criteria may be possible. For example, rather than choose the steepest gradient from among all edges, the edges incident at each vertex can first be filtered to keep only the 3 strongest, or only those larger than some given "strength of connection" threshold. The strongest gradient may then be selected from among them. This variant may be used to compute a weighted matching. Another modification may be to compute phi(A) as a hash function on the fly, which may be more computationally efficient on a GPU than storing it in a table as a preprocess.

Figure 7:
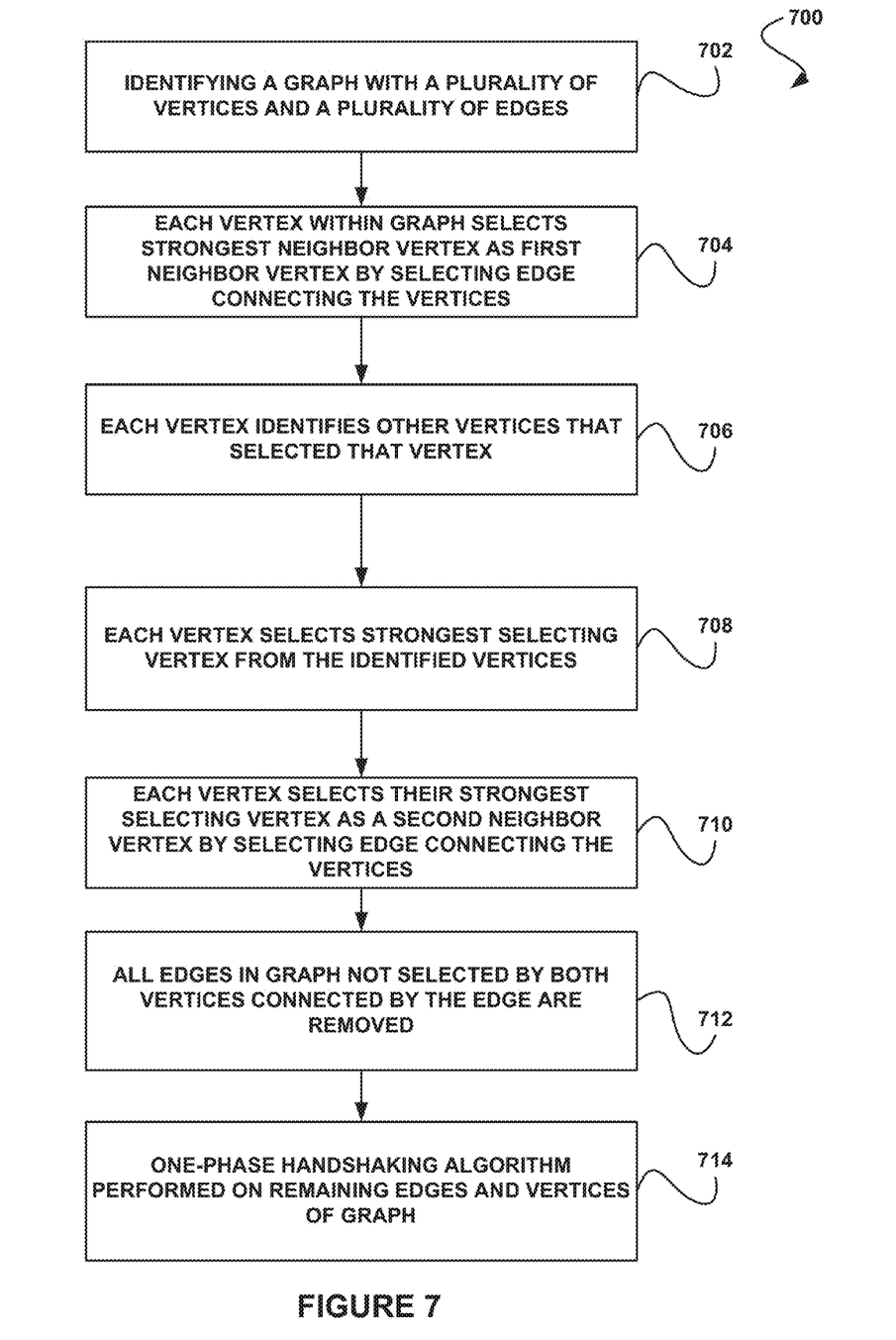
FIG. 7 shows a two-phase handshaking method for performing graph matching in parallel, in accordance with yet another embodiment.

FIG. 7 shows a two-phase handshaking method 700 for performing graph matching in parallel, in accordance with another embodiment. As an option, the method 700 may be carried out in the context of the functionality of FIGS. 1-6. Of course, however, the method 700 may be implemented in any desired environment. It should also be noted that the aforementioned definitions may apply during the present description.

As shown in operation 702, a graph with a plurality of vertices and a plurality of edges is identified. Additionally, as shown in operation 704, each vertex within the graph selects their strongest neighbor vertex as a first neighbor vertex by selecting the edge connecting the vertex to the strongest selecting vertex. Further, as shown in operation 706, each single vertex within the graph identifies other vertices within the graph that selected that single vertex during operation 704. Further still, as shown in operation 708, each vertex within the graph determines a strongest selecting vertex from the vertices within the graph identified in operation 706, where such strongest selecting vertex contains the most edges of all the vertices within the graph that selected that vertex. In one embodiment, each vertex within the graph may determine a selecting vertex from the vertices within the graph identified in operation 706 based on criteria other than strength. For example, each vertex within the graph may arbitrarily determine a selecting vertex from the vertices within the graph identified in operation 706.

Also, as shown in operation 710, each vertex within the graph selects their strongest selecting vertex as a second neighbor vertex by selecting the edge connecting the vertex to the strongest selecting vertex. In addition, as shown in operation 712, all edges within the graph that were not selected by both vertices connected by the edge in operation 704 and operation 710 are removed from the graph. Furthermore, as shown in operation 714, a one-phase handshaking algorithm (e.g., the one-phase handshaking method for performing graph matching in parallel illustrated in FIG. 3, etc.) is performed on the remaining edges and vertices of the graph. In this way the amount of unassigned vertices remaining after each iteration may be reduced.

Figure 8:
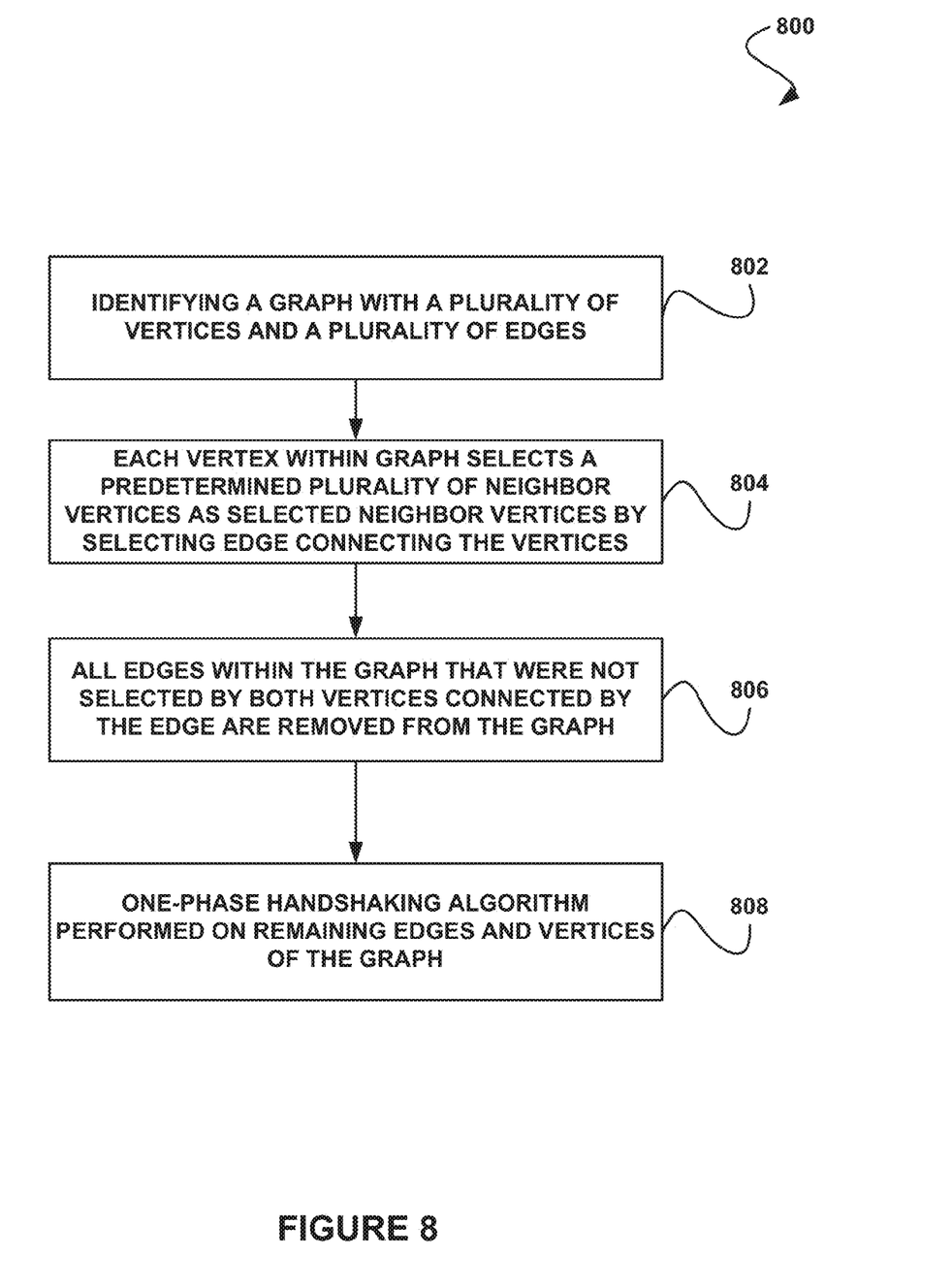
FIG. 8 shows a method for N-way two-phase matching, in accordance with yet another embodiment.

FIG. 8 shows a method 800 for N-way two-phase matching, in accordance with another embodiment. As an option, the method 800 may be carried out in the context of the functionality of FIGS. 1-7. Of course, however, the method 800 may be implemented in any desired environment. It should also be noted that the aforementioned definitions may apply during the present description.

As shown in operation 802, a graph with a plurality of vertices and a plurality of edges is identified. Additionally, as shown in operation 804, each vertex within the graph selects a predetermined plurality of their neighbor vertices as selected neighbor vertices by selecting the edges connecting the vertex to the predetermined plurality of their neighbor vertices. In one embodiment, the predetermined plurality of neighbor vertices may be selected based on a number assigned to each of the vertices. For example, the predetermined plurality of neighbor vertices with the largest random numbers assigned to them may be selected. In another embodiment, the predetermined plurality of neighbor vertices may be selected based on a weight of each of the vertices. For example, the predetermined plurality of neighbor vertices with the highest weight (e.g., largest number of adjacent edges, etc,) may be selected.

Additionally, as shown in operation 806, all edges within the graph that were not selected by both vertices connected by the edge are removed from the graph. Further, as shown in operation 808, a one-phase handshaking algorithm (e.g., the one-phase handshaking method for performing graph matching in parallel illustrated in FIG. 3, etc.) is performed on the remaining edges and vertices of the graph.

Further still, Table 3 illustrates an exemplary 2-way handshaking method. Of course, it should be noted that the method shown in Table 3 is set forth for illustrative purposes only, and thus should not be construed as limiting in any manner.

TABLE 3

| | |
|---|---|
| 1. | Every vertex selects 2 neighbors and extends 2 hands: A.handshake1 = B, A.handshake2 = C. |
| 2. | All edges AB such that A and B did not extend a hand B in round 1, and B did not extend a hand to A round 1, are removed from the graph. |
| 3. | Every vertex selects one of its neighbors from among the (at most 2) edges still connected to it, A.handshake3 = B. |
| 4. | If vertex A.handshake3 = B and B.handshake3 = A, then AB is included in the matching. |
| 5. | Restore the entire graph, excluding those edges and vertices included in the matching, and repeat from #1 until the graph consists only of singleton vertices. |

In one embodiment, the above method may reduce the amount of global communication and may remove a global synchronization point. Additionally, Table 4 illustrates an exemplary N-way handshaking method. Of course, it should be noted that the method shown in Table 4 is set forth for illustrative purposes only, and thus should not be construed as limiting in any manner.

TABLE 4

| | |
|---|---|
| 1. | Every vertex select N neighbors and extends N handshakes, A.handshake1 = B1, . . . A.handshakeN = BN. |
| 2. | All edges AB such that A and B did not extend a hand to B, and B did not extend a hand to A, are removed from the graph. |
| 3. | Every vertex selects one of its neighbors from among the (at most 2) edges still connected to it, A.handshake3 = B. |
| 4. | If vertex A.handshake3 = B and B.handshake3 = A, then AB is included in the matching. |
| 5. | Restore the entire graph, excluding those edges and vertices included in the matching, and repeat from #1 until the graph consists only of singleton vertices. |

Figure 9:
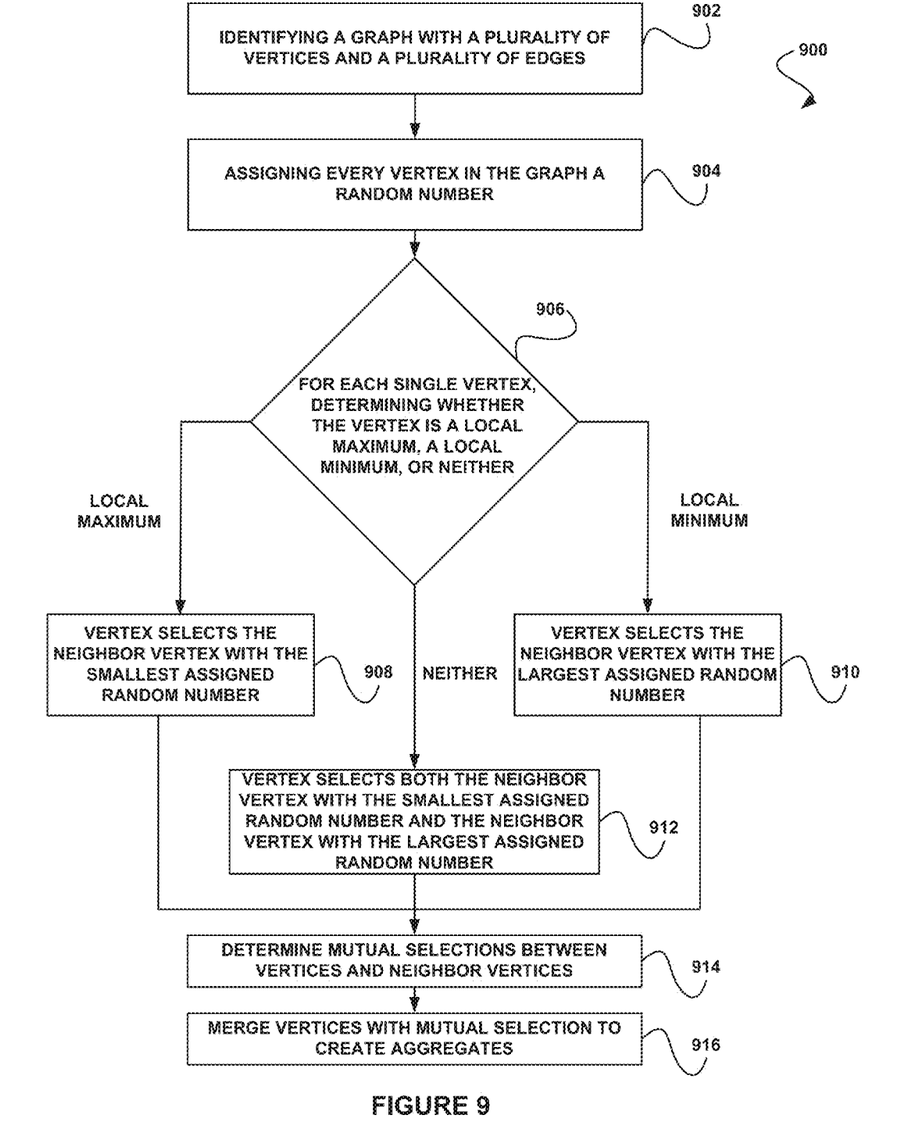
FIG. 9 shows a method for gradient-based two-way matching, in accordance with yet another embodiment.

FIG. 9 shows a method 900 for gradient-based two-way matching, in accordance with another embodiment. As an option, the method 900 may be carried out in the context of the functionality of FIGS. 1-8. Of course, however, the method 900 may be implemented in any desired environment. It should also be noted that the aforementioned definitions may apply during the present description.

As shown in operation 902, a graph with a plurality of vertices and a plurality of edges is identified. Additionally, as shown in operation 904, every vertex in the graph is assigned a random number. Further, as shown in operation 906, for each single vertex of the graph (e.g., each vertex within the graph), it is determined whether that single vertex is the local maximum vertex, the local minimum vertex, or neither the local maximum or local minimum vertex.

For example, each single vertex within the graph may compare the random number assigned to the single vertex against the random numbers assigned to all of the neighbors of the single vertex. Additionally, it may be determined whether the random number assigned to the single vertex is greater than all of the random numbers assigned to all of the neighbors of the single vertex (e.g., the local maximum vertex), less than all of the random numbers assigned to all of the neighbors of the single vertex (e.g., the local minimum vertex), or neither greater than nor less than all of the random numbers assigned to all of the neighbors of the single vertex.

Additionally, if it is determined in operation 906 that a single vertex is the local maximum vertex, then in operation 908 the single vertex selects the neighbor vertex with the smallest assigned random number. Further, if it is determined in operation 906 that a single vertex is the local minimum vertex, then in operation 910 the single vertex selects the neighbor vertex with the largest assigned random number. Further still, if it is determined in operation 906 that a single vertex is neither the local maximum vertex nor the local minimum vertex, then in operation 912 the single vertex selects both the neighbor vertex of the single vertex that contains the smallest assigned random number and the neighbor vertex of the single vertex that contains the largest assigned random number.

Also, as shown in operation 914, each vertex in the graph determines whether a mutual selection exists between the vertex and a neighbor vertex of the graph. In one embodiment, if a plurality of mutual selections exist for a particular vertex (e.g., as a result of selecting more than one neighbor vertex), the vertex may choose one mutual selection from the plurality. In another embodiment, the selection may be arbitrary, based on one or more criteria, based on a default selection, etc. In addition, as shown in operation 916, each vertex that detects mutual selection with a neighbor vertex is merged with that neighbor vertex to create an aggregate of the two vertices.

Table 5 illustrates an exemplary N-way steepest gradient handshaking method. Of course, it should be noted that the method shown in Table 5 is set forth for illustrative purposes only, and thus should not be construed as limiting in any manner.

TABLE 5

| |
|---|
| If phi(A) is a local maxima, then |
|     A.handshake1 = B s.t. phi(B) is the lowest among A's neighbors |
|     A.handshake2 = null |
| Else If phi(A) is a local minima, then |
|     A.handshake1 = B s.t. phi(B) is the highest among A's neighbors |
|     A.handshake2 = null |
| Else // neither min or max |
|     A.handshake1 = B s.t. phi(B) is the lowest among A's neighbors |
|     A.handshake2 = B s.t. phi(B) is the highest among A's neighbors |

This may "force" a vertex to extend hands in "opposite directions" along the graph. As with the steepest gradient criteria used in the 1-phase handshaking approach, this method may impose a random local structure. For graphs whose edge weights do not correspond to some physical system, this may result in improved performance. Additionally, there may be a number of possible extensions to this criterion, such as choosing the strongest gradient from among edges that pass some strength-of-connection criteria, etc.

Figure 10:
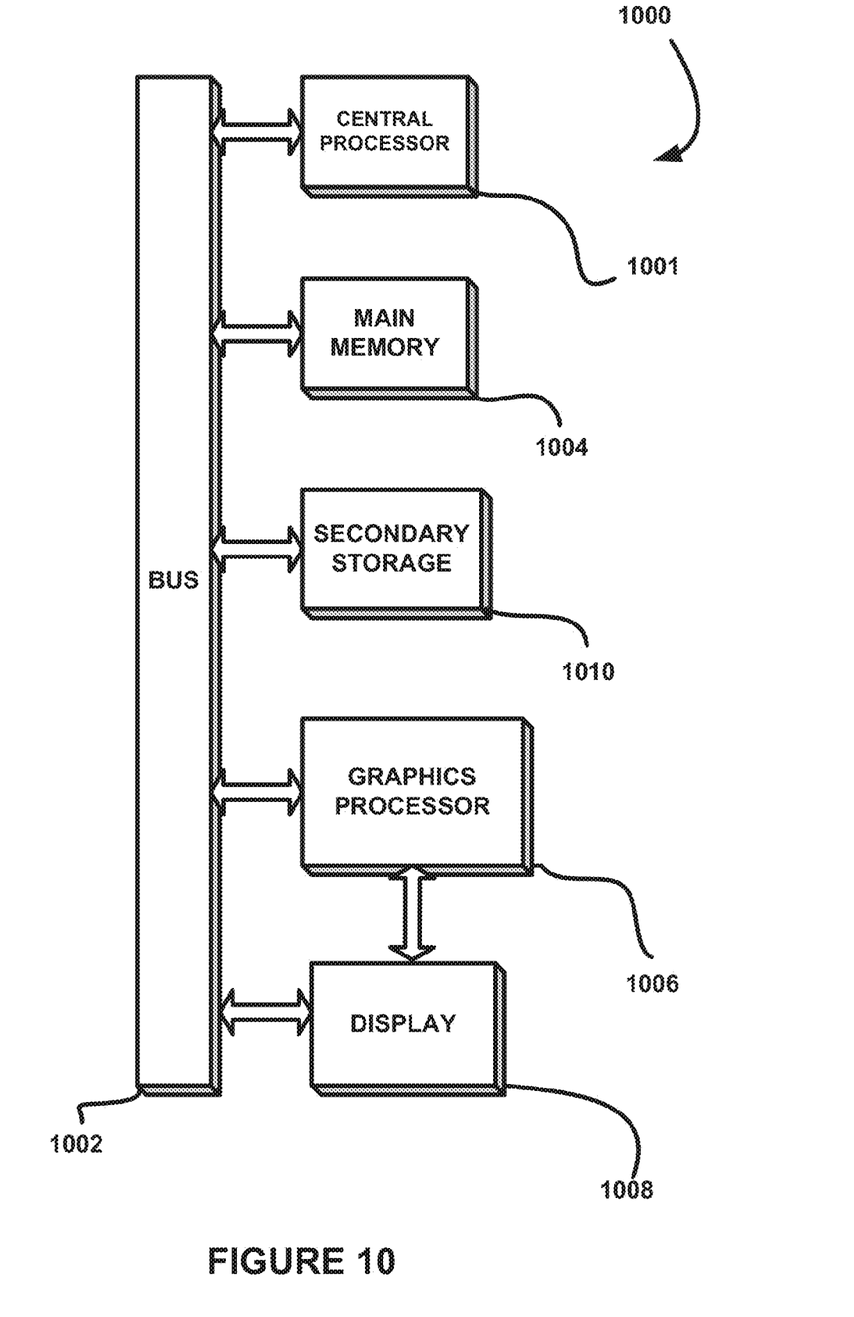
FIG. 10 illustrates an exemplary system in which the various architecture and/or functionality of the various previous embodiments may be implemented.

FIG. 10 illustrates an exemplary system 1000 in which the various architecture and/or functionality of the various previous embodiments may be implemented. As shown, a system 1000 is provided including at least one host processor 1001 which is connected to a communication bus 1002. The system 1000 also includes a main memory 1004. Control logic (software) and data are stored in the main memory 1004 which may take the form of random access memory (RAM).

The system 1000 also includes a graphics processor 1006 and a display 1008, i.e. a computer monitor. In one embodiment, the graphics processor 1006 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 1000 may also include a secondary storage 1010. The secondary storage 1010 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 1004 and/or the secondary storage 1010. Such computer programs, when executed, enable the system 1000 to perform various functions. Memory 1004, storage 1010 and/or any other storage are possible examples of computer-readable media.

In one embodiment, the architecture and/or functionality of the various previous figures may be implemented in the context of the host processor 1001, graphics processor 1006, an integrated circuit (not shown) that is capable of at least a portion of the capabilities of both the host processor 1001 and the graphics processor 1006, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 1000 may take the form of a desktop computer, laptop computer, and/or any other type of logic. Still yet, the system 1000 may take the form of various other devices m including, but not limited to a personal digital assistant (PDA) device, a mobile phone device, a television, etc.

Further, while not shown, the system 1000 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying a graph with a plurality of vertices and a plurality of edges;
   selecting, for each vertex in the plurality of vertices, one or more neighbor vertices based on one or more criteria, and, for each edge in the plurality of edges that connects the vertex with a selected neighbor vertex in the one or more neighbor vertices, determining whether a mutual selection exists between the vertex and the selected neighbor vertex, wherein the mutual selection exists when the vertex selected the neighbor vertex and the neighbor vertex selected the vertex; and
   merging at least two vertices in the plurality of vertices based on mutual selection between the at least two vertices to create at least one aggregate vertex,
   wherein selecting, for each vertex in the plurality of vertices, one or more neighbor vertices based on one or more criteria is performed in a data-parallel manner for at least two of the vertices in the plurality of vertices via a parallel processor.

2. The method of claim 1, further comprising assigning a random number to each vertex in the plurality of vertices.

3. The method of claim 2, wherein selecting, for each vertex in the plurality of vertices, the one or more neighbor vertices based on one or more criteria comprises:
   determining whether the vertex is a local maximum; and
   if the vertex is a local maximum, then the neighbor vertex is selected as a neighboring vertex of the vertex with the smallest assigned random number, or
   if the vertex is not the local maximum, then the neighbor vertex is selected as a neighboring vertex of the vertex with the largest assigned random number.

4. The method of claim 2, wherein selecting, for each vertex in the plurality of vertices, the one or more neighbor vertices based on one or more criteria comprises:
   determining whether the vertex is a local maximum, a local minimum, or neither the local maximum nor the local minimum; and
   if the vertex is a local maximum, then the neighbor vertex is selected as a neighboring vertex of the vertex with the smallest assigned random number,
   if the vertex is a local minimum, then the neighbor vertex is selected as a neighboring vertex of the vertex with the largest assigned random number, or
   if the vertex is neither the local maximum nor the local minimum, then a first neighbor vertex is selected as a neighboring vertex of the vertex with the smallest assigned random number and a second neighbor vertex is selected as a neighboring vertex of the vertex with the largest assigned random number.

5. The method of claim 1, wherein selecting, for each vertex in the plurality of vertices, the one or more neighbor vertices based on one or more criteria comprises comparing gradients associated with each edge connected to the vertex.

6. The method of claim 1, wherein selecting, for each vertex in the plurality of vertices, the one or more neighbor vertices based on one or more criteria comprises:
   selecting a pseudo-random number for the vertex according to a hash function; and
   comparing the pseudo-random number to pseudo-random numbers selected by each of one or more neighboring vertices connected to the vertex.

7. The method of claim 1, wherein selecting, for each vertex in the plurality of vertices, the one or more neighbor vertices based on one or more criteria comprises selecting a pre-determined number of neighbor vertices from a plurality of neighbor vertices connected to the vertex based on random numbers assigned to each neighbor vertex of the plurality of neighbor vertices.

8. The method of claim 1, wherein selecting, for each vertex in the plurality of vertices, the one or more neighbor vertices based on one or more criteria comprises selecting a number of neighbor vertices from a plurality of neighbor vertices connected to the vertex by:

comparing random numbers assigned to each neighbor vertex of the plurality of neighbor vertices to a threshold value; and selecting the number of neighbor vertices assigned a random number above the threshold value.

9. The method of claim 1, further comprising repeating the method of claim 1 for a number of iterations.

10. The method of claim 9, wherein the method is repeated until a pre-determined number of vertices in the graph have been merged.

11. The method of claim 9, wherein the method is repeated for a pre-determined number of iterations.

12. A computer program product embodied on a non-transitory computer readable medium, comprising:
   code for identifying a graph with a plurality of vertices and a plurality of edges;
   code for selecting, for each vertex in the plurality of vertices, one or more neighbor vertices based on one or more criteria, and, for each edge in the plurality of edges that connects the vertex with a selected neighbor vertex in the one or more neighbor vertices, determining whether a mutual selection exists between the vertex and the selected neighbor vertex, wherein the mutual selection exists when the vertex selected the neighbor vertex and the neighbor vertex selected the vertex; and
   code for merging at least two vertices in the plurality of vertices based on mutual selection between the at least two vertices to create at least one aggregate vertex,
   wherein selecting, for each vertex in the plurality of vertices, one or more neighbor vertices based on one or more criteria is performed in a data-parallel manner for at least two of the vertices in the plurality of vertices via a parallel processor.

13. The computer program product embodied on the non-transitory computer readable medium of claim 12, further comprising code for assigning a random number to each vertex in the plurality of vertices.

14. The computer program product embodied on the non-transitory computer readable medium of claim 13, wherein selecting, for each vertex in the plurality of vertices, the one or more neighbor vertices based on one or more criteria comprises:
   determining whether the vertex is a local maximum; and
   if the vertex is a local maximum, then the neighbor vertex is selected as a neighboring vertex of the vertex with the smallest assigned random number, or
   if the vertex is not the local maximum, then the neighbor vertex is selected as a neighboring vertex of the vertex with the largest assigned random number.

15. The computer program product embodied on the non-transitory computer readable medium of claim 13, wherein selecting, for each vertex in the plurality of vertices, the one or more neighbor vertices based on one or more criteria comprises:
   determining whether the vertex is a local maximum, a local minimum, or neither the local maximum nor the local minimum; and
   if the vertex is a local maximum, then the neighbor vertex is selected as a neighboring vertex of the vertex with the smallest assigned random number,
   if the vertex is a local minimum, then the neighbor vertex is selected as a neighboring vertex of the vertex with the largest assigned random number, or
   if the vertex is neither the local maximum nor the local minimum, then a first neighbor vertex is selected as a neighboring vertex of the vertex with the smallest assigned random number and a second neighbor vertex is selected as a neighboring vertex of the vertex with the largest assigned random number.

16. A system comprising:
   a memory storing a graph with a plurality of vertices and a plurality of edges; and
   a parallel processor connected to the memory and configured to:
      identifying the graph;
      selecting, for each vertex in the plurality of vertices, one or more neighbor vertices based on one or more criteria, and, for each edge in the plurality of edges that connects the vertex with a selected neighbor vertex in the one or more neighbor vertices, determining whether a mutual selection exists between the vertex and the selected neighbor vertex, wherein the mutual selection exists when the vertex selected the neighbor vertex and the neighbor vertex selected the vertex; and
      merging at least two vertices in the plurality of vertices based on mutual selection between the at least two vertices to create at least one aggregate vertex,
   wherein selecting, for each vertex in the plurality of vertices, one or more neighbor vertices based on one or more criteria is performed in a data-parallel manner for at least two of the vertices in the plurality of vertices via the parallel processor.

17. The system of claim 16, wherein the parallel processor is further configured to assign a random number to each vertex in the plurality of vertices.

18. The system of claim 17, wherein selecting, for each vertex in the plurality of vertices, the one or more neighbor vertices based on one or more criteria comprises:
   determining whether the vertex is a local maximum; and
   if the vertex is a local maximum, then the neighbor vertex is selected as a neighboring vertex of the vertex with the smallest assigned random number, or
   if the vertex is not the local maximum, then the neighbor vertex is selected as a neighboring vertex of the vertex with the largest assigned random number.

19. The system of claim 17, wherein selecting, for each vertex in the plurality of vertices, the one or more neighbor vertices based on one or more criteria comprises:
   determining whether the vertex is a local maximum, a local minimum, or neither the local maximum nor the local minimum; and
   if the vertex is a local maximum, then the neighbor vertex is selected as a neighboring vertex of the vertex with the smallest assigned random number,
   if the vertex is a local minimum, then the neighbor vertex is selected as a neighboring vertex of the vertex with the largest assigned random number, or
   if the vertex is neither the local maximum nor the local minimum, then a first neighbor vertex is selected as a neighboring vertex of the vertex with the smallest assigned random number and a second neighbor vertex is selected as a neighboring vertex of the vertex with the largest assigned random number.

20. The system of claim 16, wherein the parallel processor is coupled to the memory via a bus.

* * * * *